US006939614B2

(12) United States Patent
Tomita

(10) Patent No.: US 6,939,614 B2
(45) Date of Patent: Sep. 6, 2005

(54) IMAGE-FIXING MEMBER, IMAGE-FIXING APPARATUS AND IMAGE-FORMING APPARATUS USING THE SAME

(75) Inventor: Kunihiko Tomita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 10/457,543

(22) Filed: Jun. 10, 2003

(65) Prior Publication Data

US 2004/0033431 A1 Feb. 19, 2004

(30) Foreign Application Priority Data

Jun. 10, 2002 (JP) ....................................... 2002-169095

(51) Int. Cl.[7] .................................................. B23B 9/04

(52) U.S. Cl. ................. 428/447; 428/473.5; 428/474.4; 399/168; 399/331

(58) Field of Search ............................. 428/447, 473.5, 428/474.4; 399/168, 331

(56) References Cited

U.S. PATENT DOCUMENTS

| | | | | |
|---|---|---|---|---|
| 5,527,657 | A | 6/1996 | Takeda et al. | |
| 6,159,588 | A | * 12/2000 | Eddy et al. | 428/215 |
| 6,370,350 | B2 | 4/2002 | Tomita | |
| 6,370,352 | B1 | 4/2002 | Tomita | |
| 6,413,690 | B2 | 7/2002 | Tomita | |
| 6,455,217 | B2 | 9/2002 | Tomita | |
| 6,492,084 | B2 | 12/2002 | Tomita | |
| 6,505,016 | B2 | 1/2003 | Tomita | |
| 6,519,439 | B2 | 2/2003 | Tomita | |

FOREIGN PATENT DOCUMENTS

| | | |
|---|---|---|
| JP | 5-339410 | 12/1993 |
| JP | 7-244442 | 9/1995 |
| JP | 2984404 | 9/1999 |
| JP | 2984409 | 9/1999 |
| JP | 2000-56602 | 2/2000 |
| JP | 2000-112271 | 4/2000 |
| JP | 3261166 | 12/2001 |

OTHER PUBLICATIONS

Machine Translation, JP 2000–056602, Kobayashi et al., Feb. 25, 2000.*

* cited by examiner

*Primary Examiner*—Randy Gulakowski
*Assistant Examiner*—Christopher Keehan
(74) *Attorney, Agent, or Firm*—Oblon, Spivak, McClelland, Maier & Neustadt, P.C.

(57) ABSTRACT

The present invention is directed to an image-fixing member which has excellent heat-resistance, wear resistance, and mold releasability and which performs heating or pressurizing for fixing an image on a recording medium. The preset invention also provides an image-fixing apparatus and image-forming apparatus using the image-fixing member. The image-fixing member of the present invention has a surface layer formed from a heat-resistant resin a nitrogen-containing heat-resistant principal chain segment and a side chain segment having a polysiloxane structure. The heat-resistant resin can also be contained in other portion than the surface layer.

20 Claims, 5 Drawing Sheets

IMAGE-FIXING MEMBER, IMAGE-FIXING APPARATUS AND IMAGE-FORMING APPARATUS USING THE SAME

BACKGROUND OF THE INVENTION

1. Field of the Invention

The present invention relates to electrophotographic apparatus for use in, for example, copying machines, printers, electrostatic recording, facsimile, and electrostatic printing.

2. Description of the Related Art

The present invention relates to image-fixing apparatus for use in electrophotographic image forming apparatus used in, for example, copying, facsimile, and printing.

In image-fixing procedures of electrophotographic image forming apparatus, image-fixing members such as belts and rollers are exposed to repeated temperatures changes within wide ranges from room temperature to high temperatures and to pressure of great forces. Such belts for use in image-fixing must have satisfactory heat resistance and mechanical strength that can endure these harsh environments. In conventional image-fixing apparatuses, a recording medium is pressurized and nipped through a heating medium such as a heating roller or heating endless belt. Thus, a toner on the roller or endless belt is heated, melted and pressurized to thereby yield a toner image fixed on the recording medium. Concurrently with this image-fixing procedure, the toner develops adhesion to the heating medium. To release the recording medium bearing the toner from the heating medium, a mold-releasing layer of a fluororesin such as polytetrafluoroethylene (PTFE), tetrafluoroethylene-perfluoroalkylvinyl ether copolymers (PFA) and fluorinated ethylene propylene copolymers (FEP) is formed on a surface of the heating member such as a heating roller or heating endless belt. In addition, to release the pressurizing medium from the backside of the recording medium, another mold-releasing layer of a fluororesin such as PTFE, PFA or FEP is formed on a surface of the pressurizing medium such as a pressurizing roller or pressurizing endless belt arranged on the opposite side of the heating member. However, these fluorine-containing resins lead slip among molecules, and the mold-releasing layer wears at a high speed during a long-term use and thereby has a short life. Accordingly, a demand has been made on solving the wear resistance problems.

As a possible solution to these problems, Japanese Patent (JP-B) No. 2984409, JP-B No. 2984404, and JP-B No. 3261166 describe that the wear resistance is improved by using a polybenzimidazole on a surface of the roller. In fact, such polybenzimidazoles have very high heat resistance and mechanical strength and very excellent wear resistance. However, when the surface layer of these mediums is made from a polybenzimidazole, the surface layer will have insufficient mold releasability, although it invites less abrasion due to its increased mechanical strength. In other words, such members for use in toner image-fixing in electrophotographic image forming apparatus must have not only high wear resistance but also satisfactory mold releasability for stably releasing the recording medium without attachment of the molten toner to an image-fixing plane. If a layer of a fluororesin such as PTFE, PFA or FEP is formed on the surface layer to exhibit excellent mold releasability, the resulting surface layer will have insufficient wear resistance. Accordingly, increasing demands have been made on techniques that can improve wear resistance while maintaining satisfactory mold releasability.

Certain heat-resistant polyimide silicone resins have been known. Examples of such resins are PIX series (trade name, available from Hitachi Chemical Co., Ltd.), KJR series (trade name, available from Shin-Etsu Chemical Co., Ltd.) and BE series (trade name, available from Bergston and Associates). The PIX series products have a viscosity of 1.1 Pa·s at 25° C. and a weight loss starting temperature of 450° C. The KJR series products have a viscosity of 1.4 Pa·s to 2.6 Pa·s at 25° C. and a weight loss starting temperature of 440° C. However, these heat-resistant polyimide silicone resins have been used for improving adhesion of $SiO_2$ films on substrate wafers at high humidity in manufacturing of semiconductors ("Silicone Handbook" pp. 501–503, Aug. 31, 1990, The Nikkan Kogyo Shimbun) and there is no suggestion for using these heat-resistant polyimide silicone reins for improving wear resistance in electrophotographic toner image-fixing apparatuses.

SUMMARY OF THE INVENTION

Under these circumstance, an object of the present invention is to provide an image-fixing member that has excellent heat resistance and wear resistance and satisfactory mold releasability (or repellency) and can serve as a heating medium and/or pressurizing medium, an image-fixing apparatus using the member, and an image-forming apparatus using the image-fixing apparatus.

After intensive investigations to achieve the above objects, the present inventors have found that an image-fixing apparatus having excellent heat resistance and wear resistance, and an image-forming apparatus using the image-fixing apparatus can be provided by using an image-fixing member that comprises a heat-resistant resin at least in its surface portion and can serve as a heating medium and/or pressurizing medium for image-fixing, in which the heat-resistant resin has a nitrogen-containing heat-resistant principal chain segment and at least one side chain segment having a polysiloxane structure (may also referred to "a polysiloxane-structure side chain segment" hereinafter). The present invention has been accomplished based on these finding.

DESCRIPTION OF THE PREFERRED EMBODIMENTS

The term "image-fixing member" as used herein means a member that may be configured to perform at least one of heating and pressurizing so as to fix an image in an image-fixing apparatus and is at least one of a heating medium and a pressurizing medium. The term "heating medium" as used herein means and includes a heating roller, a heating endless belt, a heating terminated belt, or the like for heating an image-recording medium bearing a toner image, and the term “pressurizing medium” as used herein means and includes a pressurizing roller, a pressurizing endless belt, a pressurizing terminated belt, or the like for heating an image-recording medium bearing a toner image, as in the conventional technologies.

Figure 1:
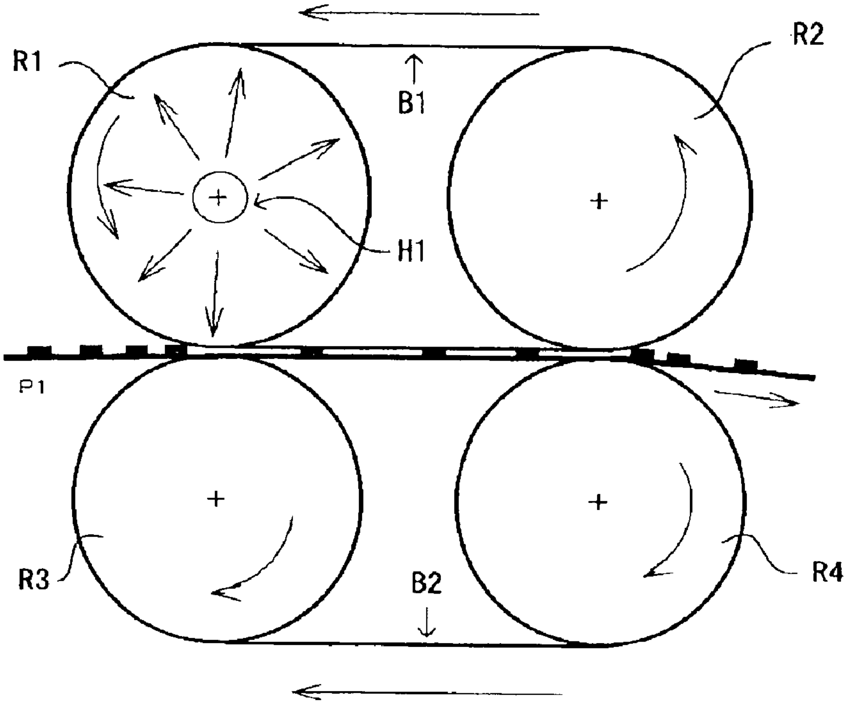
FIG. 1 is a cross-sectional view showing an example of an image-fixing apparatus for use in the present invention.

With reference to FIG. 1, an illustrative image-fixing apparatus of the present invention basically comprises an image-fixing roller “R1” having a heater “H1” in its body, and a pressurizing roller “R3” facing the image-fixing roller “R1”. The image-fixing roller “R1” and the pressurizing roller “R3” cooperatively nip a toner image-bearing member “P1”. The image-fixing apparatus may further comprise a cooling roller “R2” and a pressurizing roller “R4”. The cooling roller “R2” is arranged downstream in the transportation direction of the toner image-bearing member “P1”, and the pressurizing roller “R4” is arranged so as to face the cooling roller “R2”. The cooling roller “R2” and the pressurizing roller “R4” cooperatively nip the toner image-bearing member “P1”. The image-fixing apparatus may further comprise an image-fixing belt “B1” and an auxiliary belt “B2”. The image-fixing belt “B1” is spanned between the image-fixing roller “R1” and cooling roller “R2”, and the auxiliary belt “B2” is spanned between the pressurizing roller “R3” and the pressurizing roller “R4”. In this case, the image-fixing roller “R1” is a heating roller, the cooling roller “R2” is a pressurizing roller, the image-fixing belt “B1” is a heating endless belt, and the auxiliary belt “B2” is a pressurizing endless belt.

These rollers, endless belts and other image-fixing members of the present invention comprise the heat-resistant resin overall or at least in their surface portion. Preferably, they have a surface coated with the heat-resistant resin.

The heat-resistant resin comprises at least one type of nitrogen-containing heat-resistant resins containing nitrogen in its principal chain segment.

The principal chain segment of the nitrogen-containing heat-resistant resin preferably has a polyimide structure, a polybenzimidazole structure, or a polyamide structure. Of these, polyimide and polybenzimidazole structures are typically preferred. Such polyimide structure includes polyetherimide and polyamide-imide structures. The polyamide structure includes a polyaramid structure.

The nitrogen-containing heat-resistant resin has a side chain segment having a polysiloxane structure. The side chain segment having a polysiloxane structure may be any of a polysiloxane structure segment such as dimethylpolysiloxane, diphenylpolysiloxane, or methylphenylpolysiloxane and may have any of a straight structure or non-straight structure such as a branched structure or partial net structure.

The nitrogen-containing heat-resistant resin should preferably have a glass transition temperature Tg of 180° C. or higher in consideration of the set image-fixing temperature, overshoot, and elevated temperature of its edges. The glass transition temperature Tg is a temperature at which C—C bonds in the resin molecules begin to rotate freely, and the strength of the resin markedly decreases at temperatures higher than Tg, although the resin itself is not softened or melted. The material for the rollers and belts as the image-fixing member can endure stress at a temperature of Tg or higher only for a short time. However, when the image-fixing system is used at a temperature of Tg or higher for a long time, the surface layer of the roller or the base (substrate) of the belt deforms to thereby invite irregular images or wrinkles of the recording medium. The better is the glass transition temperature Tg higher, and it is preferably 200° C. or higher, more preferably 250° C. or higher, and further preferably 300° C. or higher.

When a recording medium such as paper is inserted into the image-fixing apparatus in image-fixing procedures, belts and rollers as image-fixing members are exposed to repeated temperature changes within wide ranges from room temperature to high temperature and to a great force applied for pressurizing and nipping. The rollers and belts for use in image-fixing must therefore have satisfactory heat resistance and mechanical strength that can endure these harsh environments. The nitrogen-containing heat-resistant resins for use in the present invention can satisfy all these requirements. Such excellent heat resistance and mechanical strength of the nitrogen-containing heat-resistant resins are probably based on the structure of resin molecules and inherent properties of nitrogen.

Figure 2:
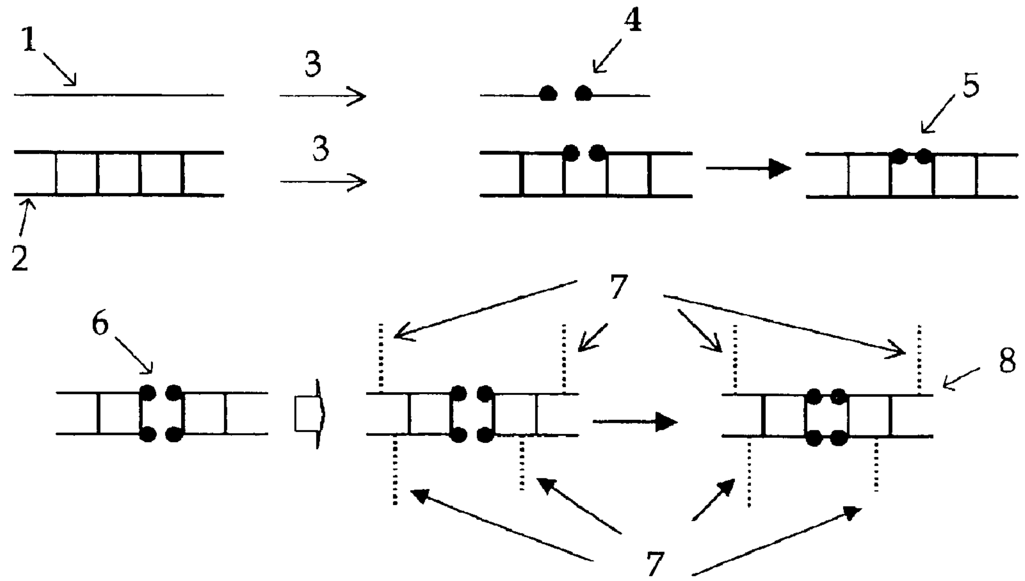
FIG. 2 is a schematic diagram showing an example of a molecular structure of the heat-resistant resin used for the present invention and its structural characteristics.

Different from conventional heat-resistant linear polymers “1”, as shown in FIG. 2, the nitrogen-containing heat-resistant resins for use in the present invention have a ladder molecular structure “2” by formation of an imide ring by a nitrogen atom contained therein or by an action of a benzene ring. Even if energy enough for molecular cleavage acts upon molecular bonds, the probability that all the molecular chains easily cleave is very low. Namely, even when one of two moieties of the ladder molecule stochastically cleaves by action of heat energy “3”, the other bond does not cleave as illustrated with “4”. In addition, the cleaved ends keep very highly active and can be re-combined immediately as illustrated with “5”.

The nitrogen-containing heat-resistant resins for use in the present invention have higher mechanical strength than conventional wholly aromatic heat-resistant resins. This is probably because the resins in question have at least one nitrogen atom in their structure and thereby yield hydrogen bonds between molecules to thereby form a three-dimensional network structure due to a hydrogen atom combined with the nitrogen atom as in an amide or imidazole or due to an oxygen atom in an acyl group moiety as in an amide or imide. The crosslinks “7” among molecules fix the molecules and enable recombination of partially cleaved bonds, if any, to thereby suppress decomposition of the molecule, as illustrated with “8”. In addition, the heat resistance and mechanical strength can further be increased by positively adding crosslinking points to the crosslinks inherent to the resins to thereby further strengthen the three-dimensional net structure, as described in the present invention.

For better image quality, the heating medium and pressurizing medium such as rollers and endless belts according to the present invention may further have a heat-resistant elastic layer as an underlayer.

The image-fixing members of the present invention are heating medium such as heating rollers and heating endless belts and/or pressurizing medium, each surface portion of which is formed of a resin comprising at least one type of nitrogen-containing heat-resistant resins, in which the nitrogen-containing heat-resistant resins have a nitrogen-containing heat resistant principal chain segment and a side chain segment having a polysiloxane structure. In the case that the nitrogen-containing heat resistant principal chain segment is included within the resin constituting at least the surface portion of the image-fixing member, as the nitrogen-containing heat resistant principal chain segment itself has cohesive force and wear resistance significantly higher than fluorine-containing resins, the image-fixing member does not substantially invite abrasion or deterioration of the surface thereof even during a long-term use. Resins having the polysiloxane side chain segment are generally repellent to other resins due to difference in surface energy. When polysiloxane side chain segments such as dimethylpolysiloxane, diphenylpolysiloxane or methylphenylpolysiloxane bonded to the nitrogen-containing heat-resistant principal chain segment, the following molecular orientation occurs. Upon film-formation, the nitrogen-containing heat-resistant principal chain segment constituting a backbone firmly self-aggregates, and the polysiloxane-structure side chain segments are repelled and align at an interface (surface of the resulting film).

The polysiloxane-structure side chain segments aligned on the surface provably increase the mold releasability of the surface layer of heating rollers or the surface of the heating endless belt. Naturally, the polysiloxane-structure side chain segments constituting branches are firmly chemically combined with the nitrogen-containing heat-resistant principal chain segment self-aggregated firmly and thereby do not drop off from the surface layer. This is true not only in the surface layer of the heating rollers or heating endless belts but also in the surface layer of the pressurizing rollers and pressurizing endless belts facing the heating rollers or heating endless belts.

The same advantages as above can be obtained according to the same principle when two or more types of resins each having a nitrogen-containing heat-resistant principal chain segment and a polysiloxane-structure side chain segment are used in combination.

Thus, the polysiloxane segments aligned on the surface increases the mold releasability of the surface layer of heating rollers or the surface of heating endless belts. In addition, a portion of the principal chain segment of the nitrogen-containing heat-resistant resin with which the polysiloxane-structure side chain segment is not combined occupies major of the principle chain segment, and the principal chain segment self-aggregated firmly thereby further increases the strength of the surface layer of the heating rollers or heating endless belts. This is true not only in the surface layer of the heating rollers or heating endless belts but also in the surface layer of the pressurizing rollers and the pressurizing endless belts facing the heating rollers or heating endless belts.

The heat-resistant resin has preferably weight-average molecular weight of 10,000 to 1,000,000.

When the nitrogen-containing heat-resistant resin has no polysiloxane-structure side chain segment with respect to the nitrogen-containing heat-resistant principal chain segment, it is an original nitrogen-containing heat-resistant resin itself and does not yield the advantages of the present invention. The nitrogen-containing heat-resistant resin must have at least one side chain segment having polysiloxane-structure relative to one principal chain segment. If the nitrogen-containing heat-resistant resin has excessively many side chain segments having polysiloxane-structure relative to one principal chain segment, the polysiloxane-structure side chain segments surround overall its principal chain segment to thereby deteriorate the properties of the backbone nitrogen-containing heat-resistant resin. The number of the side chain segments having polysiloxane-structure relative to one principal chain segment is preferably from 1 to 200, more preferably from 3 to 100, further preferably from 5 to 50, and typically preferably from 7 to 20, per molecule of the nitrogen-containing heat-resistant resin.

The side chain segment having polysiloxane-structure can have, for example, a dimethylpolysiloxane structure, a diphenylpolysiloxane structure, or a methylphenylpolysiloxane structure. The dimethylpolysiloxane structure and the diphenylpolysiloxane structure inherently have satisfactory mold releasability and heat resistance. Among such polysiloxane structures, the dimethylpolysiloxane structure has the highest mold releasability and slidability, and the diphenylpolysiloxane structure has higher heat resistance and stain resistance. The methylphenylpolysiloxane structure can be used for controlling the balance between these properties.

Figure 3:
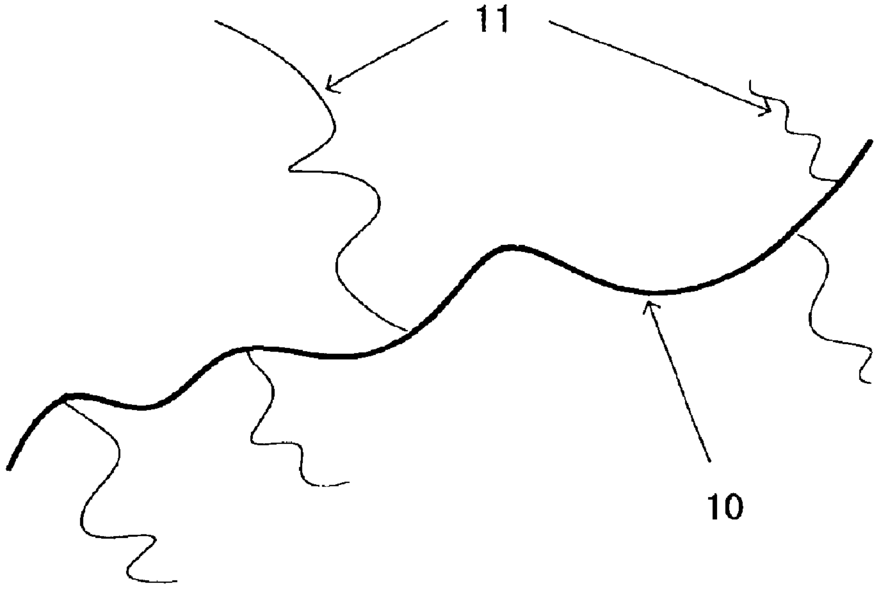
FIG. 3 is a schematic diagram showing an example of a molecular structure of the heat-resistant resin used for the present invention.

The nitrogen-containing heat-resistant resin may have a structure, as shown in FIG. 3, that has the nitrogen-containing heat-resistant principal chain segment "10" and the side chain segment having polysiloxane-structure "11", hanging or branched from the principal chain segment, and can be prepared according to any procedure.

Figure 4:
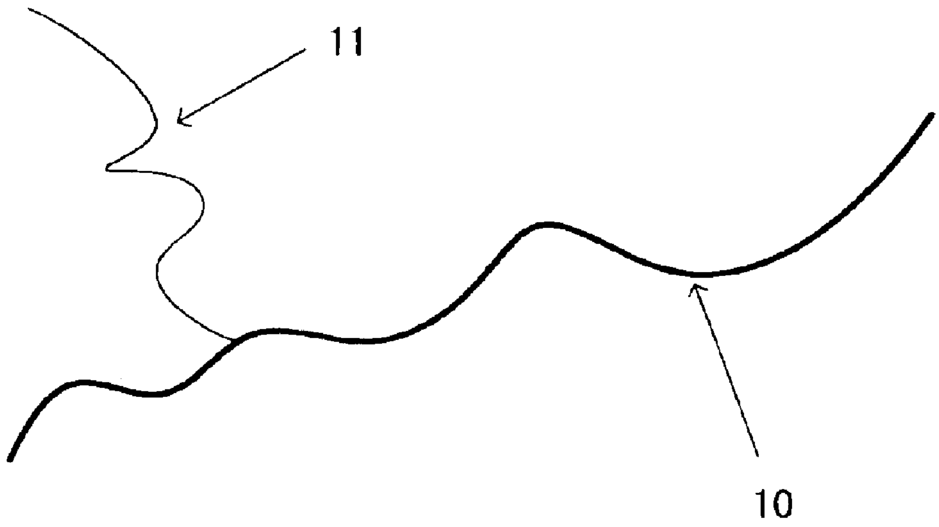
FIG. 4 is a schematic diagram showing another example of a molecular structure of the heat-resistant resin used for the present invention.

Moreover, as shown in FIG. 4, the nitrogen-containing heat-resistant resin may have at least one polysiloxane branch "11" relative to the principal chain segment "10" per molecule.

For example, the nitrogen-containing heat-resistant resin can be prepared by, after preparation of a vinyl siloxane macromonomer such as Formula 2 through Formula 7, copolymerizing the same with a maleimide monomer expressed by Formula 1, or the like. Example of the macromonomer includes a reactive monomer in which at least one of reactive vinyl groups is introduced to polysilicon. More specifically, examples thereof include a vinyl macromonomer having a polysiloxane structure, in which acrylic acid or α-methylacrylic acid (methacrylate) are esterificated with a silanol or a silanecarbinol. The examples also include a macromonomer in which above-mentioned vinyl macromonomer is copolymerized with maleimide monomer which may have a substituent or the like, par avance.

An illustrative monomer for the principal chain segment is:

Formula 1

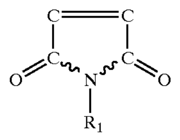

Illustrative monomers for the side chain segment are:

Formula 2

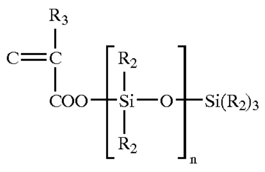

Formula 3

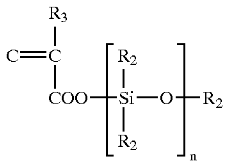

-continued

Formula 4

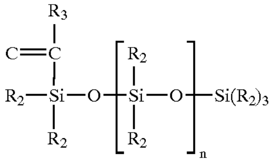

Formula 5

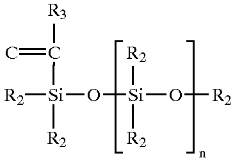

Formula 6

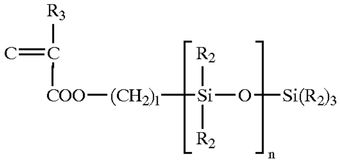

Formula 7

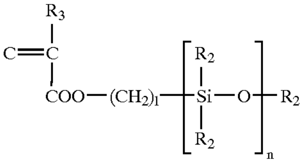

wherein

"$R_1$" is a substituent such as phenyl, benzyl, methyl, ethyl, propoxyl, or cyclohexyl;

"$R_2$" is a substituent such as hydrogen, methyl, or phenyl;

"$R_3$" is a hydrogen or methyl; and

"l" is an integer of 10 or less and "n" is an integer ranging of 100 or less.

Figure 5:
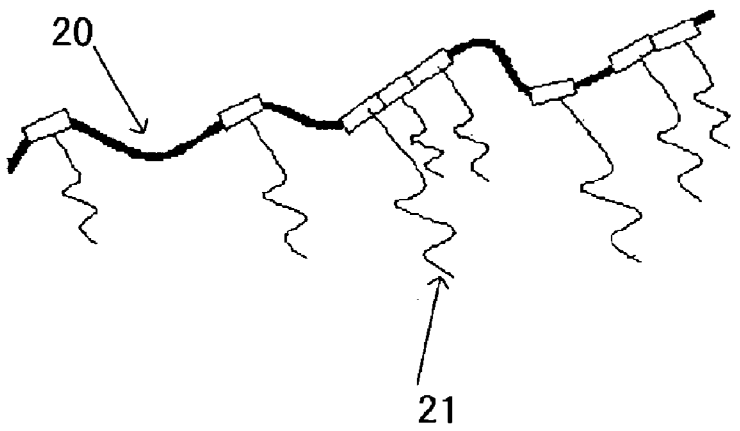
FIG. 5 is a schematic diagram showing an example of the heat-resistant resin having a principal chain segment and side chain segments.

In general, the nitrogen-containing heat-resistant resin may be prepared according to solution polymerization in which the monomers for constituting the backbone and branch are mixed with a solvent such as propylene glycol monomethyl ether, toluene and other cosolvents, and the mixture is subjected to radical reaction using peroxide. This method can yield a "comb graft polymer" as shown in FIG. 5.

For example, the heat-resistant resin contains a monomer unit "20" expressed by Formula I, and at least one of macromonomer units "21" expressed by Formula II through Formula VII:

Formula I

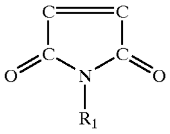

Formula II

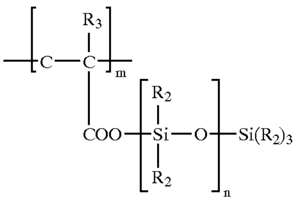

-continued

Formula III

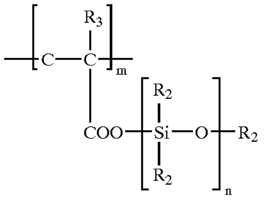

Formula IV

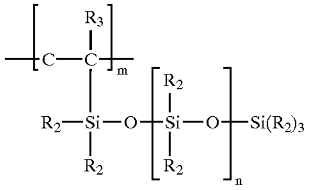

Formula V

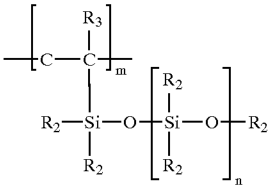

Formula VI

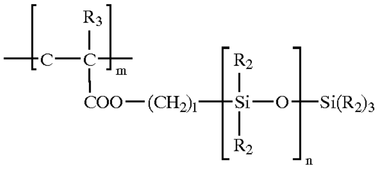

Formula VII

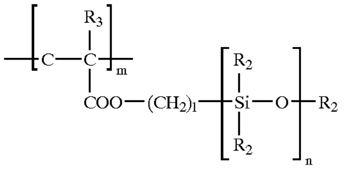

wherein

"$R_1$" is a substituent such as phenyl, benzyl, methyl, ethyl, propoxyl, or cyclohexyl;

"$R_2$" is a substituent such as hydrogen, methyl, or phenyl;

"$R_3$" is a hydrogen or methyl; and

"l" is an integer range of 1 to 10, and "n" is an integer range of 1 to 100.

If "l" lies out of the above numerical range, degree of freedom of the side chain segment having a polysiloxane structure is increased thereby reducing intended effects. If "n" lies out of the above numerical range, the structure of molecules becomes agglomerated and sphere in shape, thus unsuitable.

The preparation method for the nitrogen-containing heat-resistant resin is not specifically limited to the above one. For example, the nitrogen-containing heat-resistant resin can be prepared by a method using a radical silicon macromonomer, in which a polyimide inclusive of a polyetherimide or polyamide-imide, or polyamide is mixed with a silicone macromonomer, and the mixture is subjected to grafting by action of a hydrogen abstraction reaction (a radical reaction) using a peroxide. It can also be prepared by, for example, a technique of incorporating a silicon macromonomer having an ethylene oxide moiety at one end into a polyetherimide or a technique of polycondensing a silicon macromonomer having an amino group at one end. Any of the resulting resins having a structure comprising a backbone resin structure and a branch polysiloxane chain, such as a structure shown in FIG. 3, can be used.

As mentioned above, the image-fixing member of the present invention comprises the heat-resistant resin, at least in the surface portion thereof, having the nitrogen-containing heat-resistant principal chain segment, and the side chain segment having a polysiloxane structure. In the embodiment of the present invention, the heat-resistant resin can be used as combination of two or more types of heat-resistant resins. The heat-resistant resin may also be a combination with other resins.

Other resins are not particularly limited provided that dose not impair the technical effects of the present invention.

Examples of the nitrogen-containing resin used as the principal chain segment of the graft polymer mentioned above and the “other resins” mentioned above are polyimide such as polyetherimide, polyamideimide or the like, polyamide, polybenzimidazole, and the like.

The polyetherimide for use herein can be prepared, for example, by a method in which 2,2,3,3-tetracarboxydiphenylene ether dianhydride and a diamine expressed by: “$H_2NRNH_2$”, wherein “R” is an aromatic hydrocarbon containing 6 to 20 carbon atoms or its halogen derivative, are subjected to a reaction in an organic solvent at a temperature of 130° C. or higher while removing water formed as a result of the reaction. The polyetherimide can also be prepared by a reaction between an aromatic bis(ether anhydride) and an organic diamine in equimolar proportions at the interface between water and an organic solvent.

Formula 9

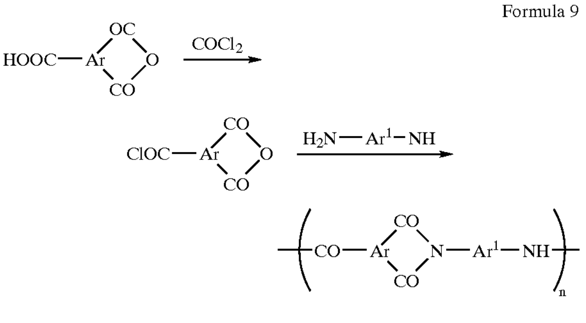

The isocyanate method, as shown in Formula 10, uses a high-rate reaction between an isocyanate group and a carboxyl group, which isocyanate group has been converted from an amino group of the aromatic diamine. This reaction is generally performed at a temperature around 100° C.

Formula 10

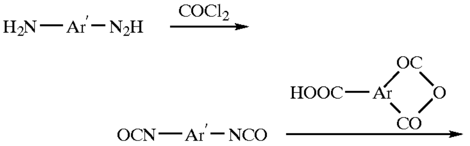

Formula 8

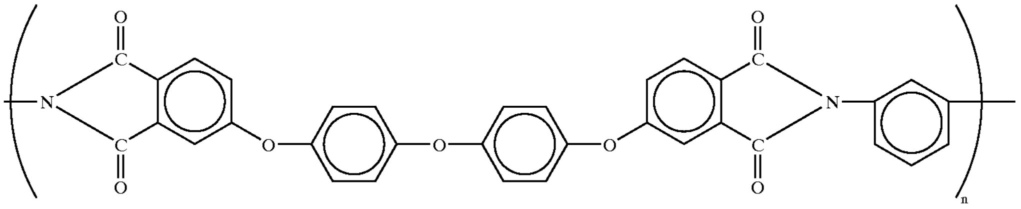

The polyamide-imide for use herein can be prepared from an aromatic tricarboxylic anhydride and an aromatic diamine and structurally comprises imide groups and amide groups arranged alternately. Such a polyamide-imide has been prepared by an acid chloride method or an isocyanate method. Both of these methods are a “bypass method”, in which one of an aromatic diamine monomer and a carboxylic monomer is converted into an activated derivative and subjected to polycondensation. This is because the reaction between the aromatic diamine and the carboxylic acid is slow. The polyamide-imide can also be prepared by a direct polycondensation method of allowing an aromatic carboxylic anhydride to directly react with an aromatic diamine in the presence of a dehydration catalyst. Such a direct polycondensation method has been developed recently.

The acid chloride method, as shown in Formula 9, uses a high-rate reaction between a chloroformyl group and an amino group, which chloroformyl group has been converted from a carboxylic group of the aromatic carboxylic anhydride.

-continued

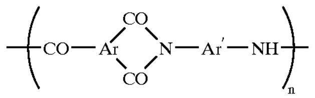

In the direct polycondensation method, an aromatic carboxylic anhydride is allowed to directly react with an aromatic diamine in the presence of a dehydration catalyst as shown in Formula 11. Reaction solvents for use herein include sulfolane, nitrobenzene, benzonitrile, and other polar organic solvents that do not dissolve the polyamide-imide. Dehydration catalysts for use herein include, for example, phosphorous acid, triphenyl phosphite, tributyl phosphate, and other organic phosphorus compounds. The reaction temperature is relatively high ranging from about 200° C. to about 300° C.

Formula 11

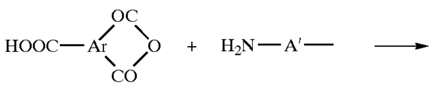

-continued

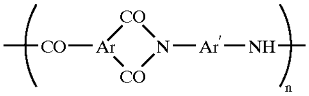

Chemical structure of the polyamide-imide:

Formula 12

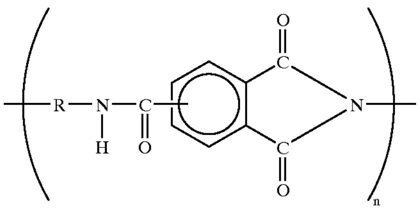

The polyimides have extremely high heat resistance next to polybenzimidazoles and can be classified as follow.

The wholly aromatic polyimides can be prepared, as shown in Formula 13, by a reaction between a tetracarboxylic dianhydride and a diamine in an organic solvent.

Formula 13

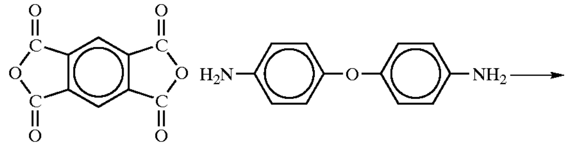

polymellitic dianhydride (PMDA)

4, 4'-diaminodiphenyl ether (DDE)

-continued

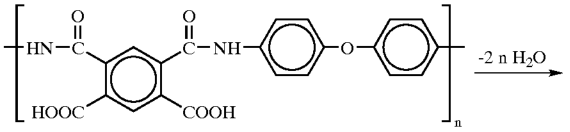

polyamide acid

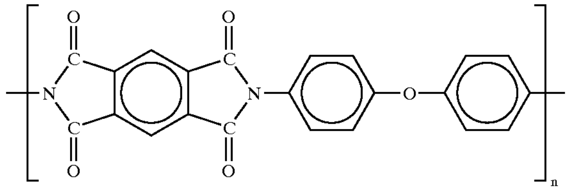

polyimide

The reaction includes two stages. A polyamic acid is synthesized by polymerization in a first stage and is then subjected to dehydration and ring-opening in a second stage to thereby yield a polyimide. Solvents for use in the polymerization generally include N,N-dimethylacetamide (DMAc), N-methylpyrrolidone (NMP), and other high-boiling amide solvents, as well as cresols, chlorophenols, and other phenol solvents; diethylene glycol dimethyl ether (diglyme), and other ether solvents; and pyridine, and other tertiary amine solvents.

The bismaleimide-based polyimides can be prepared, as shown in Formula 14, by preparing an oligomer having a double bond at its end using an excess amount of bismaleimide, and curing or crosslinking the oligomer using a crosslinking reaction at the double bond. In addition, some polyimides having a triazine skeleton are prepared from bismaleimide and a dicyanate. These polyimides can have Tg ranging from 200° C. to 300° C. by changing the proportions of constitutional monomers.

Formula 14

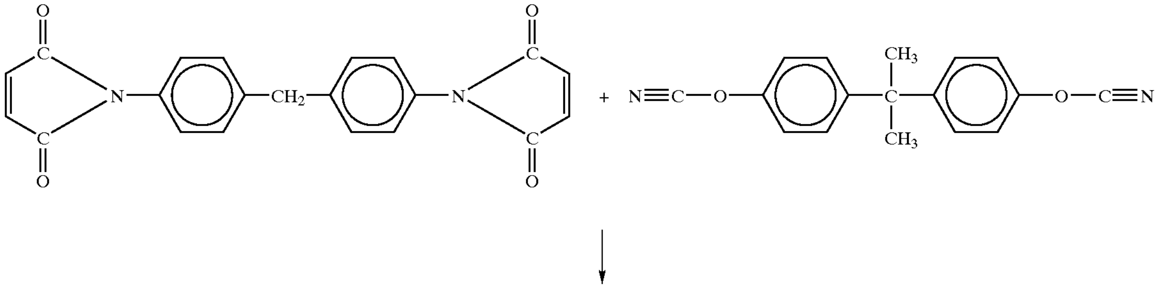

-continued

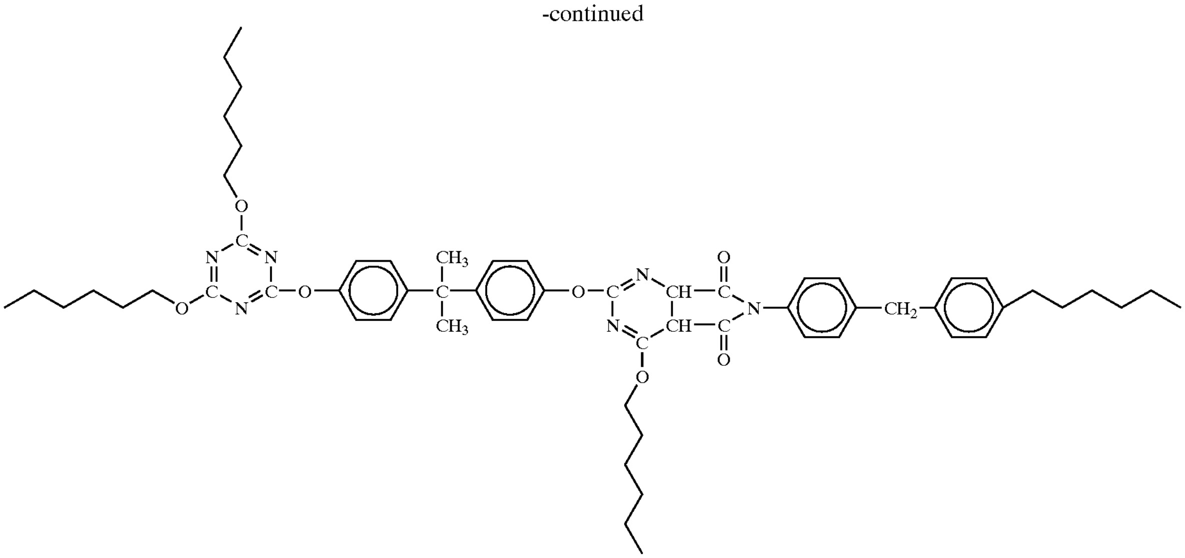

The polybenzimidazoles (PBIs) are stable heterocyclic polymers. Production methods therefor are described in various U.S. patents, such as U.S. Re. Pat. No. 26,065, U.S. Pat. No. 3,313,783, U.S. Pat. No. 3,509,108, U.S. Pat. No. 3,518,234, U.S. Pat. No. 3,555,389, U.S. Pat. No. 3,433,772, U.S. Pat. No. 3,408,336, U.S. Pat. No. 3,578,644, U.S. Pat. No. 3,549,603, U.S. Pat. No. 3,708,439, U.S. Pat. No. 4,154,919, U.S. Pat. No. 4,312,976, U.S. Pat. No. 4,377,546, and U.S. Pat. No. 4,549,388. Production methods for PBIs are also described by J. P. Critchley, G. J. Knight, and W. W. Wright in "Heat-resistant Polymers—Technologically Useful Materials", Plenum Press, New York (1983), pp. 259–322.

Among these polybenzimidazoles, a poly-2,2'-(m-phenylene)-5,5'-bibenzimidazole expressed by Formula 15 is used in the examples of the present invention. This polybenzimidazole has a heat distortion temperature of 435° C. and thereby has very high heat resistance, which is the highest heat resistance among nitrogen-containing heat-resistant resins in existence. However, polybenzimidazoles generally absorb moisture, since hydrogen atoms which is bonded to nitrogen atoms in their structure tends to form a hydrogen bonding with water so as to form ammonia. The moisture absorption invites deformation of the roller surface layer or the belt, which in turn invites irregular images or wrinkles of the recording medium. To suppress the moisture absorption, as shown in Formula 15, one having a N-substituted moiety converted from a hydrogen moiety where the hydrogen atom is bonded to the nitrogen atom consisting secondary amine in the structure, and 50% or more of which N-substituted moiety is methylated is used in the present invention. This improvement avoids deformation due to moisture absorption and thereby avoids irregular images or wrinkles of the recording medium.

Formula 15

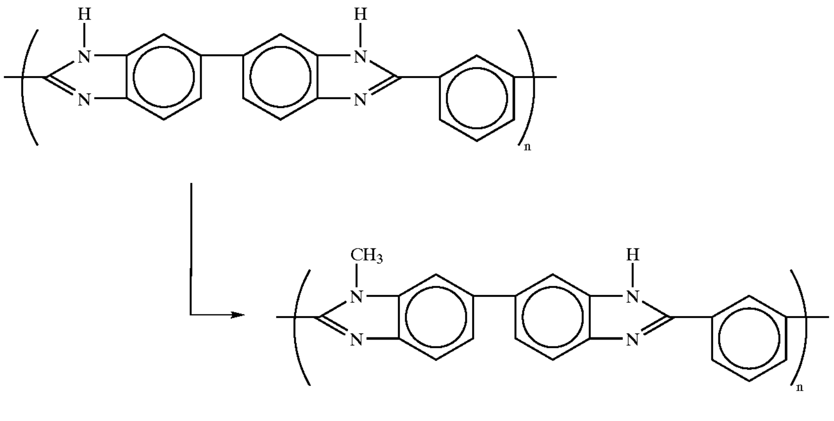

General radical reaction initiators such as 2,2'-azobisisobutyronitrile (AIBN), as well as peroxides can be used as a radical reaction initiator in the present invention.

Examples of peroxides for use in the present invention are as follows.

Ketone peroxides expressed by "H—OO—R—OO—H", such as methyl ethyl ketone peroxide, methyl isobutyl ketone peroxide, ethyl acetoacetate peroxide, acetylacetone peroxide, methylcyclohexanone peroxide, and cyclohexanone peroxide.

Hydroperoxides expressed by "R—OO—H", such as 2,4,4-trimethylpentyl-2-hydroperoxide, diisopropylbenzene hydroperoxide, cumene hydroperoxide, and t-butyl hydroperoxide.

Diacyl peroxides expressed by Formula 16 such as isobutyryl peroxide, 2,4-dichlorobenzoyl peroxide, o-chlorobenzoyl peroxide, bis-3,5,5-trimethylhexanoyl peroxide, lauroyl peroxide, benzoyl peroxide, and p-chlorobenzoyl peroxide.

Formula 16

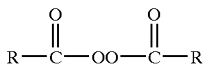

Dialkyl peroxides expressed by "R—OO—R", such as dicumyl peroxide, 2,5-dimethyl-2,5-di-(t-butylperoxy) hexane, 1,3-bis-(t-butylperoxyisopropyl)benzene, t-butyl cumyl peroxide, di-t-butyl peroxide, 2,5-dimethyl-2,5-di-(t-butylperoxy) hexane, and tris(t-butylperoxy)triazine.

Peroxyketals expressed by "R—OO—R'—OO—R", such as 1,1-di-t-butylperoxy-3,3,5-trimethylcyclohexane, 1,1-di-t-butylperoxycyclohexane, 2,2-di-(t-butylperoxy)butane, n-butyl 4,4-di-t-butylperoxyvalerate, and 2,2-bis(4,4-di-t-butylperoxycyclohexyl)propane.

Alkyl peresters expressed by Formula 17, such as 2,4,4-trimethylpentyl peroxyneodecanoate, α-cumyl peroxyneodecanoate, t-butyl peroxyneodecanoate, t-butyl peroxyneohexanoate, t-butyl peroxypivalate, 2,4,4-trimethylpentyl peroxy-2-ethylhexanoate, t-amyl peroxy-2-ethylhexanoate, t-butyl peroxy-2-ethylhexanoate, t-butyl peroxyisobutyrate, di-t-butyl peroxyhexahydroterephthalate, t-butyl peroxy-3,5,5-trimethylhexanoate, t-butyl peroxyacetate, t-butyl peroxybenzoate, and d-t-butyl peroxytrimethyladipate.

Formula 17

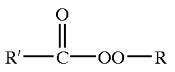

Percarbonates expressed by Formula 18, such as di-3-methoxybutyl peroxydicarbonate, di-2-ethylhexyl peroxydicarbonate, bis(4-t-butylcyclohexyl) peroxydicarbonate, diisopropyl peroxydicarbonate, t-butyl peroxyisopropyl carbonate, 1,6-bis(t-butyl peroxycarbonyloxy)hexane, and diethylene glycol bis(t-butyl peroxycarbonate).

Formula 18

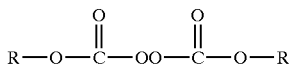

However; these are illustrative examples of the radical reaction initiator, and the type of the radical reaction initiator is not specifically limited in the present invention. In the examples of the present invention, resins are synthetically prepared by radical polymerization. However, the preparation method of the resins for use in the present invention is not specifically limited, as long as it can yield a target heat-resistant resin containing a side chain segment having polysiloxane-structure, and also includes ion polymerization, and other procedures.

In addition, the polymerization can also be performed by, for example, bulk polymerization, solution polymerization, suspension polymerization, and emulsion polymerization.

By crosslinking molecules of one type of the heat-resistant resins, the mixture of two or more types of the heat-resistant resins, or the mixture of one or more types of the heat-resistant resins with one or more types of other resins, which constitutes at least the surface portion of the image-fixing member, the resin layer becomes more firm and strong to thereby increase the mechanical strength of the image-fixing member. The crosslinking can also prevent mechanical dropping off of the nitrogen-containing heat-resistant resin molecular unit having the polysiloxane-structure side chain segment in its surface portion to thereby avoid deterioration in properties.

Examples of the crosslinking procedure include hydrogen abstraction reaction using peroxide, crosslinking with melamine, and crosslinking with isocyanate. However, the crosslinking procedure is not specifically limited in the present invention.

The resin layer may further comprise one or more dispersed resin particles of silicone, fluorine-containing, or nitrogen-containing heat-resistant resins having an average particle diameter of 20 μm or less. By dispersing these resin fine particles into the resin layer, the fine particles present on the surface of the resin layer avoids adhesion to another member or medium in vacuo to thereby avoid the formation of wrinkles due to adhesion-induced machine jitter or twist induced by a slight difference in peripheral speed. However, these advantages may not be obtained when the particles have an excessively small average particle diameter. The average particle diameter is, therefore, preferably from 0.1 μm to 10 μm, more preferably from 0.2 μm to 10 μm, and further preferably from 0.3 μm to 8 μm.

The resin layer of the image-fixing member of the present invention can further comprise a conductive material having conductivity of $10^7$ Ω or less. Such conductive materials include, for example, carbon black, polyacetylenes, tetracyanoquinonedimethane (TCNQ), ionic surfactants, antimony trioxide, tin oxide, iron oxide, and the like. One or more of these conductive materials can be dispersed in the resin layer. By dispersing these conductive materials into the resin layer, irregular discharge due to friction can be prevented to thereby avoid spark-induced malfunction of the electrophotographic device or irregular images such as adhesion of toner dust induced by charge of the image-fixing apparatus. The average particle diameter of the conductive material is preferably from about 0.01 μm to about 2 μm.

The surface layers of the heating roller and the pressurizing roller according to the present invention can be prepared, for example, by coating such as dipping, spraying, and nozzle-coating. The heating endless belt and pressurizing endless belt according to the present invention can be prepared by coating such as dipping using a mold, spraying or nozzle-coating, as well as centrifugation in which a hollow mold is rotated.

There is no particular limitation to the structures of heating roller, pressurizing roller, heating belt and pressurizing belt, and any rollers and belts known in the art can be suitably used.

The heating roller comprises a heater therein, a hollow metal member surrounding the heater, an elastic layer disposed on the surface of the hollow metal member, a mold-releasing layer disposed on the elastic layer. The heater is, for example, a resistive heat generator, a halogen heater, or the like.

The pressurizing roller has an identical structure to that of the heating rollers, provided that does not comprise a heater.

The heating endless belt comprises a base, an elastic layer on the base, a mold-releasing layer on the elastic layer.

The pressurizing endless belt has the identical structure to that of the heating endless belt, provided that does not comprise the mold-releasing belt.

The image-fixing apparatus of the present invention are not specifically limited as long as it comprises at least one of the image-fixing members serving as heating medium and/or pressurizing medium. The image-fixing member is preferably at least one of a heating rotator and a pressurizing rotator. Furthermore, it is preferred that the heating rotator and the pressurizing rotator are either a heating roller and a pressurizing roller or a heating belt and a pressurizing belt.

The image-forming apparatus of the present invention are not specifically limited as long as they each comprise the image-fixing apparatus comprising the image-fixing member.

EXAMPLES

The present invention will be illustrated in further detail with reference to several examples and a comparative example below, which are not intended to limit the scope of the invention.

Example 1

| | |
|---|---|
| Polybenzimidazole (available from Clariant Co., Ltd.) | 9.0 parts by weight |
| Silicone-graft polyimide (i.e., acrylic vinylsilicone-maleimide copolymer, LBI-101-1 available from Soken Chemical & Engineering Co., Ltd.) | 1.0 part by weight |
| N,N-Dimethylacetamide (solvent) | 90.0 parts by weight |

A coating liquid was prepared from the above materials, and then was applied to an aluminium roller by dipping. Thereafter, it was dried at 170° C. for 8 hours.

The coated film was baked at 300° C. for 2 hours. The resin constituting the film had Tg of 430° C. or higher.

As a result, a mixture film 5 μm thick comprising a polybenzimidazole and a silicone resin-graft polyimide was formed. The resulting heating roller was integrated into a copying machine imagio 7070 (trade name, available from Ricoh Co., Ltd.) and was subjected to a durability test at an image-fixing temperature of 185° C.

After the durability test of 800,000 sheets, no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that some change was observed on detail observation in the luster of a portion on the resulting image where the hook came in contact with, but each of which was trivial.

Example 2

| | |
|---|---|
| Polyimide resin varnish (Rikacoat PN-20, available from New Japan Chemical Co., Ltd.) | 9.0 parts by weight |
| Silicone-graft polyimide (i.e., acrylic vinylsilicone-maleimide copolymer, LBI-101-1, available from Soken Chemical & Engineering Co., Ltd.) | 1.0 part by weight |

-continued

| | |
|---|---|
| N,N-Dimethylacetamide (solvent) | 90.0 parts by weight |

A coating liquid was prepared from the above materials and then was applied to an aluminium roller by dipping. Thereafter, it was dried at 170° C. for 8 hours.

The coated film was baked at 300° C. for 2 hours. The resin constituting the film had Tg of 220° C. or higher.

As a result, a mixture film 5 μm thick comprising a polyimide and a silicone resin-graft polyimide was formed. The resulting heating roller was integrated into a copying machine imagio 7070 (trade name, available from Ricoh Co., Ltd.) and was subjected to a durability test at an image-fixing temperature of 185° C.

After the durability test of 800,000 sheets, no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that the some change was observed in detail observation in luster of a portion on the resulting image where the hook came in contact with, but each of which was trivial.

Example 3

| | |
|---|---|
| Polyimide resin varnish (Rikacoat PN-20, available from New Japan Chemical Co., Ltd.) | 9.0 parts by weight |
| Silicone macromonomer (BX16-192, available from Dow Corning Toray Silicone Co., Ltd.) | 2.0 parts by weight |
| 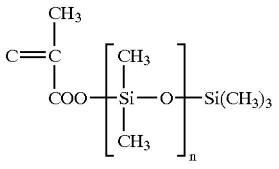 | |
| Kayacumene H (a peroxide, available from Kayaku Akzo Corporation) | 2.0 parts by weight |
| N,N-Dimethylacetamide (solvent) | 90.0 parts by weight |

A coating liquid was prepared from the above materials and then was applied to an aluminium roller by dipping. Thereafter, was dried at 170° C. for 8 hours.

The coated film was baked at 300° C. for 2 hours. The resin constituting the film had Tg of 220° C. or higher.

As a result, a mixture film 5 μm thick comprising a polyimide and a silicone resin-graft polyimide was formed. The resulting heating roller was integrated into a copying machine imagio 7070 (trade name, available from Ricoh Co., Ltd.) and was subjected to a durability test at an image-fixing temperature of 185° C.

After the durability test (800,000 sheets), no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that some change was observed on detail observation in the luster of a portion on the resulting image where the hook came in contact with, but each of which was trivial.

Example 4

| | |
|---|---|
| Polybenzimidazole (available from Clariant Co., Ltd.) | 9.0 parts by weight |
| Silicone-graft polyimide (i.e., acrylic vinylsilicone-maleimide copolymer, LBI-101-1 available from Soken Chemical & Engineering Co., Ltd.) | 1.0 part by weight |
| N,N-Dimethylacetamide (solvent) | 90.0 parts by weight |

A liquid was prepared from the above materials, and then was molded in a hollow mold by centrifugation. Thereafter, it was dried at 170° C. for 8 hours.

The molded article was baked at 300° C. for 2 hours. The resin constituting the molded article had Tg of 430° C. or higher.

As a result, a mixture film 40 μm thick comprising a polybenzimidazole and a silicone resin-graft polyimide was formed. The resulting heating endless belt and pressurizing endless belt were integrated into an image-fixing apparatus shown in FIG. 1, the image-fixing apparatus was mounted to a copying machine imagio 7070 (available from Ricoh Co., Ltd.) and was subjected to a durability test at an image-fixing temperature of 185° C.

After the durability test (800,000 sheets), no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that some change was observed on detail observation in the luster of a portion on the resulting image where the hook came in contact with, but each of which was trivial.

Example 5

| | |
|---|---|
| Polybenzimidazole (available from Clariant Co., Ltd.) | 9.0 parts by weight |
| Silicone-graft polyimide (i.e., acrylic vinylsilicone-maleimide copolymer, LBI-101-1 available from Soken Chemical & Engineering Co., Ltd.) | 1.0 part by weight |

-continued

| | |
|---|---|
| Kaya-acyl IB-C20 (a peroxide, available from Kayaku Akzo Co., Ltd.) | 2.0 parts by weight |
| N,N-Dimethylacetamide (solvent) | 90.0 parts by weight |

A liquid was prepared from the above materials, and then was molded in a hollow mold by centrifugation. Thereafter, it was dried at 170° C. for 8 hours.

The molded article was baked at 300° C. for 2 hours. The resin constituting the molded article had Tg of 430° C. or higher.

As a result, a mixture film 40 μm thick comprising a polybenzimidazole and a silicone resin-graft polyimide was formed. The resulting heating endless belt and pressurizing endless belt were integrated into an image-fixing apparatus shown in FIG. 1, the image-fixing apparatus was mounted to a copying machine imagio 7070 (available from Ricoh Co., Ltd.) and was subjected to a durability test at an image-fixing temperature of 185° C.

After the durability test (800,000 sheets), no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that some change was observed on detail observation in the luster of a portion on the resulting image where the hook came in contact with, but each of which was trivial.

Example 6

| | |
|---|---|
| Polybenzimidazole (Clariant Co., Ltd.) | 9.0 parts by weight |
| Silicone-graft polyimide (i.e., acrylic vinylsilicone-maleimide copolymer, LBI-101-1 available from Soken Chemical & Engineering Co., Ltd.) | 1.0 part by weight |
| Lublon L-2 (a powdery polytetrafluoroethylene, available from Daikin Industries, Ltd.) | 10.0 parts by weight |
| Kaya-acyl IB-C20 (a peroxide, available from Kayaku Akzo Co., Ltd.) | 2.0 parts by weight |
| N,N-Dimethylacetamide (solvent) | 90.0 parts by weight |

A liquid was prepared from the above materials, and then was molded in a hollow mold by centrifugation. Thereafter, it was dried at 170° C. for 8 hours.

The molded article was baked at 300° C. for 2 hours. The resin constituting the molded article had Tg of 430° C. or higher.

As a result, a mixture film 40 μm thick comprising a polybenzimidazole and a silicone resin-graft polyimide was formed. The resulting heating endless belt and pressurizing endless belt were integrated into an image-fixing apparatus shown in FIG. 1, the image-fixing apparatus was mounted to a copying machine imagio 7070 (available from Ricoh Co., Ltd.) and was subjected to a durability test at an image-fixing temperature of 185° C.

After the durability test (800,000 sheets), no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that some change was observed on detail observation in the luster of a portion on the resulting image where the hook came in contact with, but each of which was trivial.

In Example 6, hardly any wrinkle was observed, whereas some wrinkle was occasionally observed in Examples 1 to 5.

Example 7

| | |
|---|---|
| Polybenzimidazole (available from Clariant Co., Ltd.) | 9.0 parts by weight |
| Silicone-graft polyimide (i.e., acrylic vinylsilicone-maleimide copolymer, LBI-101-1 available from Soken Chemical & Engineering Co., Ltd.) | 1.0 part by weight |
| Conductive carbon (KETJENBLACK EC, available from Lion Corporation) | 4.0 parts by weight |
| Kaya-acyl IB-C20 (a peroxide, available from Kayaku Akzo Co., Ltd.) | 2.0 parts by weight |
| N,N-Dimethylacetamide (solvent) | 90.0 parts by weight |

A liquid was prepared from the above materials, and then was molded in a hollow mold by centrifugation. Thereafter, was dried at 170° C. for 8 hours.

The molded article was baked at 300° C. for 2 hours. The resin constituting the molded article had Tg of 430° C. or higher.

As a result, a mixture film 40 μm thick comprising a polybenzimidazole and a silicone resin-graft polyimide was formed. The resulting heating endless belt and pressurizing endless belt were integrated into an image-fixing apparatus shown in FIG. 1, the image-fixing apparatus was mounted to a copying machine imagio 7070 (available from Ricoh Co., Ltd.) and was subjected to a durability test at an image-fixing temperature of 185° C.

After the durability test (800,000 sheets), no irregular images such as winding to the roller or off-set occurred, and apparently visible problems such as hook marks on images did not occur, and the resulting images were of nearly the same quality as images obtained at initial stages. The target number of sheets in this durability was 500,000 sheets. After the durability test (800,000 sheets), the surface of the roller was observed to find that it was little worn and that the luster of a portion on the surface where a hook came in contact with did not substantially changed. After the durability test (1,000,000 sheets), it was found that the hook was somewhat worn, that the luster of the roller surface changed to some extent, and that some change was observed on detail observation in the luster of a portion on the resulting image where the hook came in contact with, but each of which was trivial.

In Example 7, spark-induced malfunction or toner dust and other irregular images were not observed at all, whereas some were occasionally observed at low temperatures and low humidity in Examples 1 to 6.

Comparative Example 1

After a durability test of 400,000 sheets, the PFA-coated image-fixing roller of the original imagio 7070 was worn, the surface layer of the hook on the roller surface was chipped away and the metal in the group was exposed, and the toner attached to the exposed metal. In addition, off-set in trace amounts often occurred in portions in addition to the hook-marked portions. The resulting image showed remarkable irregular luster in a region corresponding to the hook mark and showed black spots comprising toner aggregates of off-set in trace amounts.

As thus described above in detail, the present invention provides image-fixing members serving as heating medium and/or pressurizing medium which have excellent heat resistance and wear resistance and satisfactory mold releasability (or repellency) and provides image-fixing apparatuses using the image-fixing members and having satisfactory heat resistance, wear resistance and mold releasability, and image-forming apparatus using the image-fixing apparatuses.

What is claimed is:

1. An image-fixing member comprising:

a heat-resistant resin, at least in a surface portion of the image fixing member, containing a nitrogen containing heat-resistant principal chain segment and a side chain segment having a polysiloxane structure, wherein the heat-resistant resin is a silicon-grafted nitrogen-containing heat-resistant resin in which a radical silicon macromonomer is grafted to a nitrogen-containing heat-resistant resin by hydrogen abstraction reaction, wherein the image-fixing member is configured to perform at least one of heating and pressurizing for image-fixing.

2. An image-fixing member according to claim 1, wherein the nitrogen-containing heat-resistant principal chain segment has at least one of a polyimide structure, a polybenzimidazole structure, and a polyamide structure.

3. An image-fixing member according to claim 2, wherein the polybenzimidazole structure is poly-2,2'-(m-phenylene)-5,5'-benzimidazole.

4. An image-fixing member according to claim 2, wherein the polybenzimidazole structure has 50% or more of N-alkyl substituents relative to a total number of hydrogen atoms bonded to nitrogen atoms which consist secondary amine in benzimidazole rings.

5. An image-fixing member according to claim 1, wherein the polysiloxane structure is at least one of a dimethyl polysiloxane structure, a methylphenyl polysiloxane structure, and a diphenyl polysiloxane structure.

6. An image-fixing member according to claim 1, wherein the heat-resistant resin contains a monomer unit expressed by Formula I, and at least one of macromonomer units expressed by Formula II through Formula VII:

Formula I

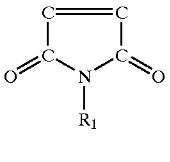

-continued

Formula II

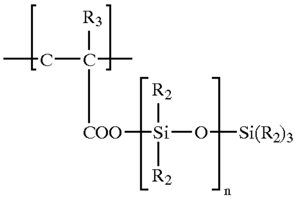

Formula III

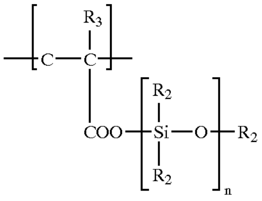

Formula IV

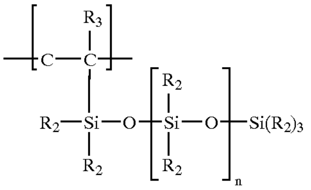

Formula V

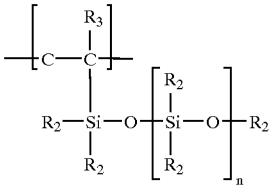

Formula VI

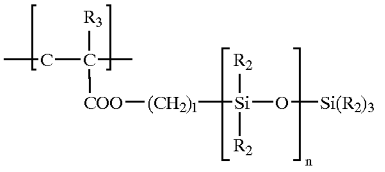

Formula VII

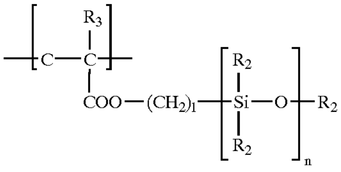

wherein

"$R_1$" expresses a substituent;

"$R_2$" expresses a substituent;

"$R_3$" expresses a hydrogen or methyl; and

"l" is an integer range of 1 to 10, and "n" is an integer range of 1 to 100.

7. An image-fixing member according to claim 6, wherein the heat-resistant resin is a copolymer of a maleimide monomer and a vinyl macromonomer which has a polysiloxane structure.

8. An image-fixing member according to claim 1, wherein the nitrogen-containing heat-resistant resin is at least one of polyimide and polyamide.

9. An image-fixing member according to claim 1, the heat-resistant resin is a mixture of the heat-resistant resin and at least one type of other resins having a nitrogen-containing heat-resistant principal chain segment.

10. An image-fixing member according to claim 9, wherein the nitrogen-containing heat-resistant principal chain segment has at least one of a polyimide structure, a polybenzimidazole structure, and a polyamide structure.

11. An image-fixing member according to claim 1, wherein the heat-resistant resin is crosslinked.

12. An image-fixing member according to claim 9, wherein the mixture of the heat-resistant resin and at least one type of other resins, is crosslinked.

13. An image-fixing member according to claim 1, wherein at least one of silicon resin particles, fluorine resin particles, and nitrogen-containing heat-resistant resin particles, is mixed and dispersed in the heat-resistant resin.

14. An image-fixing member according to claim 1, wherein at least one type of conductive materials is mixed and dispersed in the heat-resistant resin.

15. An image-fixing member according to claim 1, wherein the image-fixing member is one of a heating roller, a heating belt, a pressurizing roller, and a pressurizing belt.

16. An image-fixing apparatus comprising:

an image-fixing member as claimed in claim 1.

17. An image-fixing apparatus according to claim 16, wherein the image-fixing member is at least one of a heating rotator configured to perform heating using a heater disposed therein, and a pressurizing rotator disposed so as to face the heating rotator and configured to nip and perform pressurizing to a recording medium cooperatively with the heating rotator.

18. An image-fixing apparatus according to claim 16, wherein the heating rotator is a heating roller, and the pressurizing rotator is a pressurizing roller.

19. An image-fixing apparatus according to claim 16, wherein the heating rotator is a heating belt, and the pressurizing rotator is a pressurizing roller.

20. An image-forming apparatus comprising:

a latent electrostatic image-bearing member;

a charger configured to charge the latent electrostatic image-bearing member;

an irradiator configured to irradiate light imagewisely to the latent electrostatic image-bearing member which is charged, so as to form a latent electrostatic image;

an image developer configured to contain a toner container from which a developer is supplied to the latent electrostatic image so as to visualize the latent electrostatic image and form a toner image;

a transfer configured to transfer the toner image onto a recording medium; and a fixer configured to fix the toner image on the recording medium, wherein the fixer is at least one of a heating rotator configured to perform heating using a heater therein, and a pressurizing rotator disposed so as to face the heating rotator and configured to nip and perform pressurizing to the recording medium cooperatively with the heating rotator, and at least surface portions of the heating rotator and the pressurizing rotator contain a heat-resistant resin which has a nitrogen-containing heat-resistant principal chain segment and a side chain segment having a polysiloxane structure, wherein the heat-resistant resin is a silicon-grafted nitrogen-containing heat-resistant resin in which a radical silicon macromonomer is grafted to a nitrogen-containing heat-resistant resin by hydrogen abstraction reaction.

* * * * *